March 1, 1960  G. L. CUNNINGHAM ET AL  2,926,990
SALT CONVERSION PROCESS
Filed Sept. 21, 1954
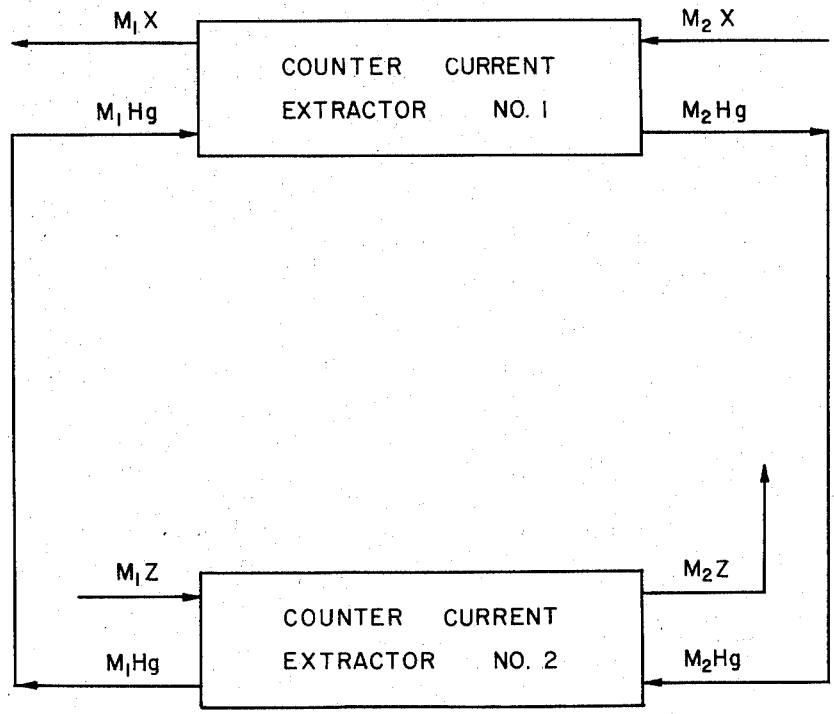
OVERALL REACTION: $M_2X + M_1Z \rightleftharpoons M_1X + M_2Z$
THE REACTION IS REVERSIBLE AND EITHER
PAIR OF REACTION PRODUCTS MAY BE
RECOVERED BY REVERSING THE FLOW
OF AMALGAM AND SALT SOLUTIONS
THROUGH THE EXTRACTORS.
*George L. Cunningham*
*Frank Pretka*
INVENTORS
BY 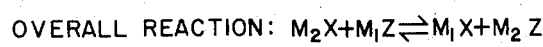
their Attorney United States Patent Office 2,926,990
Patented Mar. 1, 1960

2,926,990

SALT CONVERSION PROCESS

George L. Cunningham and Frank Pretka, San Antonio, Tex., assignors to Callery Chemical Company, Pittsburgh, Pa., a corporation of Pennsylvania Application September 21, 1954, Serial No. 457,454

2 Claims. (Cl. 23—14)

This invention relates to new and useful improvements in a salt conversion process and more particularly to a process whereby one salt is converted into another salt by an exchange reaction with a liquid metal amalgam.

In the past processes which have been available for converting one salt into another salt have involved metathetic or exchange reactions in which a pair of salts are soluble in a single solvent and in which one of the reaction products is separable by means of differential solubility or differential volatility. Metathetic processes of this type have not always proved to be very practical because of the difficulty in finding suitable salts for metathetic reactions which are soluble in a single solvent and which produce a reaction product which is separable from the reactants.

It is therefore one object of this invention to provide a new and improved exchange type salt conversion process which is not dependent upon differential solubility or volatility of the reaction products. Another object of this invention is to provide a new and improved salt conversion process in which a salt exchanges metal ions with a liquid metal amalgam. Another object is to provide a new and improved salt conversion process in which a salt solution is run countercurrently to a liquid metal amalgam and exchanges metal ions with the amalgam to produce a salt of the metal of the amalgam and an amalgam of the metal from the salt. Other objects will become apparent from time to time throughout the specification and claims as hereinafter related.

This invention comprises a new and improved process of converting one salt into another and will be described more fully hereinafter and the novelty of which will be particularly pointed out and distinctly claimed.

In the accompanying drawings to be taken as a part of this specification there is shown a flow diagram illustrating the application of this process to the conversion of two salts by effecting an exchange of metal ions between said salts without requiring a solid phase separation.

This invention is based upon the discovery that an amalgam will react with an aqeous or non-aqueous solution of a salt to form another amalgam and another salt according to the equation: $M_1X + M_2Hg \rightleftharpoons M_1Hg + M_2X$, where $M_1$ and $M_2$ are metals which form liquid amalgams and the amalgams of which are not reactive with the solvent and neither oxidize nor reduce the anion X. As was shown in the equation this reaction never goes to completion but exists as an equilibrium. The relative status of the equilibrium will vary according to the solvent used and the type of metal ions $M_1$ and $M_2$ which are involved in the reaction. We have also discovered that since this reaction exists as an equilibrium the reactants may be contacted in a countercurrent manner and thus cause the reaction to go substantially to completion in either direction depending upon the direction of flow of the reactants. Therefore, if the reactants are flowed countercurrently the reaction will go substantially to completion to the right hand side of the equation. If the flow of reactants and reaction products from the last named reaction is reversed the reaction can be made to go substantially to completion in the opposite direction. We have also found that if the product amalgam from the first reaction is run countercurrently with another salt containing another anion Z a similar exchange reaction will take place between the salt and the amalgam and a different salt and a different amalgam thus produced. The amalgam produced in this reaction may be the same as the reactant amalgam in the first reaction if the salt reacted is one of that metal. The amalgam formed in this reaction could then be recycled through the first named reaction. By the continuous circulation of this amalgam through two countercurrent reactors as indicated in the drawings it is possible to cause two different salts to exchange metal ions according to the reaction: $M_2X + M_1Z \rightleftharpoons M_1X + M_2Z$. As indicated in the equation this reaction is reversible and can be made to go to completion in either direction according to the direction of flow of the reactants relative to the amalgam. Since the liquid in each of the countercurrent reactors is in contact with a liquid amalgam and the reactions can be made to go substantially to completion the conversions are almost 100% and the salt solutions produced are substantially pure. There is therefore no purification problem in connection with the salt products and no solid phases which require separation. The salts are recovered from the solution by simply evaporating the solution and crystallizing out the desired salt. This reaction, however, must be carried out in a reactor which is not electrically conductive to prevent discharge of the amalgam.

We have found that the equilibria for this type of reaction are relatively independent of the solvents used and thus it is possible to use non-aqueous solvents as well as aqueous solvents. For example, the salt $M_1X$ may be dissolved in water while the salt $M_2Z$ is dissolved in some non-aqueous solvent, or both solvents may be water or both solvents may be non-aqueous solvents as the situation may require. In carrying out this type of reaction any metals can be used provided that they form liquid amalgams. The negative ions can be practically any ion or combination of ions provided that the negative ion will not be reduced by reaction with the amalgam. Some metals have a relatively low solubility in mercury and this tends to limit the practical application of this process in certain cases. In order to avoid the formation of solid amalgams it is preferred that the concentration of the metal in the amalgam be maintained within the range of solubility of metal in mercury. While the equilibrium value for these reactions is relatively independent of the solvents used and the negative ions used it is affected by the metal ions which are exchanged in the reaction. It has been found that certain metals react with a solution of a salt which produces an equilibrium which is quite far in the direction of a formation of the amalgam. Other metals produce an equilibrium which is far in the direction of producing salt of the metal of the amalgam which was initially used. We have found as a general rule that when the two metals involved in the process are from the same general group in the periodic table the equilibria of the reactions are more nearly ideal. On the other hand if the metals in the process are from different groups in the periodic table the equilibria of the reactions are generally quite far toward the production of an amalgam containing the less basic metal. While these limitations affect the equilibria of the reaction and thus affect the speed with which the reaction can be carried out and size of the countercurrent reactor required for this process they do not make the process inoperative except in circumstances where the amalgams react with the solvent or reduce or oxidize the negative ion of the salt. This process is very general in nature and with suitable modifications to take into account reactivity of different amalgams and finding suitable solvents for the salts used the process can be used for a wide variety of salt conversions. The process is particularly advantageous for the conversion of salts such as the borohydrides which have a tendency to decompose in the more common solvents such as water or alcohol.

In developing this process we tested the equilibrium of a large number of amalgams and salts in a variety of solvents. We also tested a large number of salt solutions and amalgams in countercurrent reactions to effect a complete conversion of the salts. In one experiment a sodium amalgam containing 0.25% sodium by weight was run countercurrent to a solution having a concentration of 25 grams potassium chloride per hundred grams of water. The solution leaving the countercurrent reactor was found to consist of water and sodium chloride plus a very small amount of potassium chloride. The amalgam leaving the other end of the reactor was found to be substantially pure potassium amalgam. The aqueous solution of sodium and potassium chloride was evaporated down and filtered at 25° C. to remove substantially pure sodium chloride and the liquor from the filtration was reused as a source of potassium chloride for further reaction. The potassium amalgam was then run countercurrent to a solution consisting of 9.5 grams of sodium sulfate per 100 grams of water. The aqueous solution leaving this reactor was found to consist of a solution of 11.5 grams potassium sulfate per 100 grams of water and a small amount of sodium sulfate in solution. This solution was evaporated at 25° C. to recover substantially pure potassium sulfate. The amalgam leaving the other end of the countercurrent reactor was found to be substantially pure sodium amalgam and was used again in the first reaction above mentioned to make the overall process cyclic. The overall reaction for this process is $$Na_2SO_4 + 2KCl \rightleftharpoons K_2SO_4 + 2NaCl$$

This process was found upon experimentation to be completely reversible according to the direction of flow of the amalgam through the reactors relative to the flow of the salt solutions.

In another experiment a sodium amalgam containing 0.4% sodium by weight was run countercurrent to an aqueous solution consisting of 25 grams potassium chloride per 100 grams of water. The solution leaving the countercurrent reactor was found to consist of water and sodium chloride plus a very small amount of potassium chloride. The solution was evaporated and filtered at 25° C. to remove substantially pure sodium chloride and the liquor of the filtration (containing potassium chloride) reused in another cycle of operation. The amalgam leaving this countercurrent reactor was found to be substantially pure potassium amalgam. This potassium amalgam was then run countercurrent to a solution consisting of 4.5 grams of sodium borohydride per 100 grams n-butylamine. The material leaving this countercurrent reactor was found to be a slurry consisting of solid potassium borohydride and n-butylamine plus a small amount of sodium borohydride and potassium borohydride in solution. This slurry was separated from the amalgam and filtered to recover substantially pure potassium borohydride. The wet crystals of potassium borohydride were washed with a methyl alcohol solution containing approximately 1% potassium hydroxide by weight and were vacuum dried to give a product containing over 95% potassium borohydride. The mother liquor from the filtration was added to the proper amount of solid sodium borohydride and the solution reused in the next cycle of operation. The amalgam leaving this countercurrent reactor was found to be substantially pure sodium amalgam and was reused in the first reaction to make the overall process cyclic. The overall reaction carried out in this process is: $NaBH_4 + KCl \rightleftharpoons KBH_4 + NaCl$. Further runs have shown that this reaction is fully reversible by merely reversing the relative direction of flow of the borohydride and chloride solutions and the sodium potassium amalgams in their respective reactors.

In another experiment a magnesium amalgam containing approximately 0.20% magnesium by weight was run countercurrent to a solution consisting of 58.63 grams of strontium borohydride in 450 grams of N,N-dimethylformamide. The solution leaving this countercurrent reactor was found to consist of magnesium borohydride and N,N-dimethylformamide plus a small amount of strontium borohydride. The amalgam was found to be substantially pure strontium amalgam and was converted back into magnesium amalgam by countercurrent reaction with magnesium chloride.

In another experiment an aqueous solution of lithium chloride was run countercurrent to a sodium amalgam 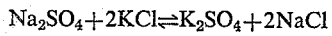 and sodium chloride solution and lithium amalgam were withdrawn from opposite ends of the countercurrent reactor. The carrying out of this particular reaction in aqueous solution has very definite limitations due to the high degree of reactivity of the lithium amalgam which is formed. It was found in carrying out this particular reaction that while lithium amalgam was formed there was also formed a substantial amount of lithium hydroxide as a result of reaction with the water. As in the case of the other reactions reported this process is reversible upon reversing the flow of the chloride solution relative to the amalgam with the result that the reaction may be made to go to completion in either direction according to the equation: $LiCl + NaHg \rightleftharpoons NaCl + LiHg$.

A very large number of experiments were run to test out the general application of this process to other salts and other amalgams using different solvents. As a result of the experiments previously noted and other experiments it was found that the exchange reaction between salt solution and an amalgam is a reversible equilibrium and may be made to go to completion as a continuous process by countercurrent reaction of the salt solution and an amalgam as previously described. Some of the other experiments which were run using other salts and other amalgams and other solvents are listed as follows to illustrate the breadth of scope of this invention:

(1) $BaCl_2 + 2NaHg \rightleftharpoons BaHg_2 + 2NaCl$ (Solvent: Water)

(2) $MgBr_2 + BaHg_2 \rightleftharpoons BaBr_2 + MgHg_2$ (Solvent: Ethanolamine)

(3) $MgCl_2 + SrHg_2 \rightleftharpoons SrCl_2 + MgHg_2$ (Solvent: N,N-dimethylformamide)

(4) $Mg(BH_4)_2 + CaHg_2 \rightleftharpoons Ca(BH_4)_2 + MgHg_2$ (Solvent: Ethanolamine and also N,N-dimethylformamide)

(5) $Mg(BH_4)_2 + BaHg_2 \rightleftharpoons Ba(BH_4)_2 + MgHg_2$ (Solvent: Ethanolamine)

(6) $2NaBH_4 + CaHg_2 \rightleftharpoons Ca(BH_4)_2 + 2NaHg$ (Solvent: Tetraethyleneglycoldimethylether, $CH_3O(C_2H_4O)_4CH_3$)

(7) $2NaBH_4 + CdHg_2 \rightleftharpoons Cd(BH_4)_2 + 2NaHg$ (Solvent: Tetraethyleneglycoldimethylether, $CH_3O(C_2H_4O)_4CH_3$)

While we have fully and completely described several of the best embodiments of our invention as required by the patent laws we wish it to be understood that within the scope of the appended claims this invention may be practiced otherwise than as specifically described.

Having thus described our invention what we desire to claim and secure by Letters Patent of the United States is:

1. A method of causing to go to completion the reaction $Mg(BH_4)_2 + MHg_2 \rightleftharpoons M(BH_4)_2 + MgHg_2$ where M is an alkaline earth metal other than magnesium and which forms an amalgam, which comprises countercurrently contacting a solution of magnesium borohydride in a nonaqueous organic solvent therefor selected from the group consisting of N,N-dimethylformamide and ethanolamine with an amalgam of M by flowing said borohydride solution into an end of a contacting zone through which said amalgam is passed from the other end thereof, recovering from said zone at said end where said magnesium borohydride is introduced the resulting effluent magnesium amalgam, and recovering from said other end of said zone the resulting borohydride of M, reversal of flow being operable to reverse the direction of said reaction.

2. A method according to claim 1 in which said alkaline earth metal M is selected from the group consisting of strontium, calcium and barium.

References Cited in the file of this patent

UNITED STATES PATENTS

| | | |
|---|---|---|
| 1,736,072 | Duschak | Nov. 19, 1929 |
| 2,392,236 | Edwards | Jan. 1, 1946 |

OTHER REFERENCES

Selke et al.: Chemical Engineering Progress, vol. 47, No. 10, pages 529–533 (1951).

Smith: American Chemical Journal, vol. 27, pages 506–543 (1907).